TRIGGER OPERATED SPEED CONTROL UNIT WITH CIRCUIT BOARD

Filed July 28, 1969

INVENTOR
CONRAD D. ROBERTSON
BY Dressler, Goldsmith, Greenewalt & Dewey
ATT'YS.

United States Patent Office 3,543,120

Patented Nov. 24, 1970

3,543,120
TRIGGER OPERATED SPEED CONTROL UNIT WITH CIRCUIT BOARD

Conrad D. Robertson, Northbrook, Ill., assignor to Skil Corporation, Chicago, Ill., a corporation of Delaware Filed July 28, 1969, Ser. No. 845,317
Int. Cl. H02p *5/16*
U.S. Cl. 318—345 10 Claims

ABSTRACT OF THE DISCLOSURE

The speed control unit includes a casing mounting a trigger for reciprocal movement relative thereto. A ceramic circuit board is contained in the casing and mounts all of the components of a speed control circuit including a resistance strip extending along one margin of the circuit board. A contact carried by the trigger slides along this resistance strip during movement of the trigger thereby defining a variable resistor which is one component of the speed control circuit.

BACKGROUND OF THE INVENTION

The present invention relates to improvements in trigger actuated speed control units of the type adapted to be mounted in the housings of portable electric tools, such as power drills, for example. Switch units of this type are shown in Frenzel Pats. 3,260,827 and 3,309,484, Matthews reissue Pat. 26,267 and Matthews et al. Pat. 3,389,365. The speed control units disclosed in these patents include a housing or casing having the various components of a speed control circuit separately mounted therein. These circuits include at least a fixed resistor, a variable resistor, a silicon controlled rectifier or similar semiconductor, a triggering element for the semiconductor, and a capacitor. The present invention constitutes an improvement over these switches in providing a single circuit board which mounts all of the components of the speed control circuit including a resistance strip which uniquely cooperates with a contact on the trigger to define the variable resistor. The present invention provides a more compact and less expensive construction and greatly facilitates and simplifies assembly and calibrating of these speed control units.

OBJECTS OF THE INVENTION

A primary object of the present invention is the provision of a new and improved trigger operated speed control unit which includes a circuit board mounting the various components of the speed control circuit.

Another object of the invention is the provision of a speed control unit which includes a circuit board mounting a resistance strip along a marginal portion thereof, the trigger being provided with a contact for sliding engagement with this strip thereby to define the variable resistor of a speed control circuit.

Still another object of the present invention is the provision of a new and improved trigger operated speed control unit which includes a circuit board mounting the various components of a speed control circuit, such unit including a casing having a chamber mounting the circuit board therein, and an epoxy composition being contained in said chamber substantially embedding the circuit board and acting as a heat sink for the circuit components thereon.

Another object of the present invention is the provision of a new and improved speed control unit circuit board which greatly facilitates trimming or calibrating of the circuit to compensate for variables resulting from the random selection of components including circuit boards with printed resistance strips thereon.

These and other objects and advantages of the invention will become apparent from the following specification disclosing a preferred embodiment shown in the accompanying drawings.

DESCRIPTION OF A PREFERRED EMBODIMENT

Figure 1:
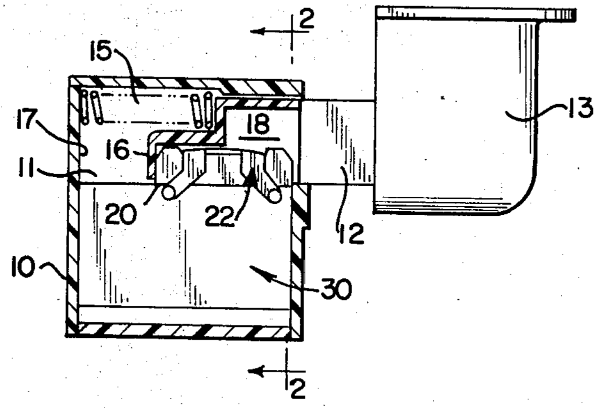
FIG. 1 is a partial side elevation and partial section of a trigger operated speed control unit embodying the present invention.

Referring to FIG. 1, the trigger operated speed control unit will be seen to include the usual casing or housing 10 having a guideway or channel 11 slidably receiving the stem 12 of a trigger 13 so as to mount the latter for reciprocal movement relative to the casing. A locking button 14 (FIG. 2) of well known construction may be provided for locking the trigger in at least its fully depressed position. It will be understood that the unit shown for purposes of illustration is of the type adapted to be mounted in the handle of the housing of a portable electric tool, such as a power drill. The present invention is of course not to be limited for use with a power drill.

A spring 15 is provided for constantly urging the trigger 13 to its extended position, suitable stop means (not shown) being provided to limit movement of the trigger 14 away from the casing 10. Innermost movement of the trigger may be limited by abutting engagement between a wall 16 on the trigger and a wall 17 on the casing.

Figure 2:
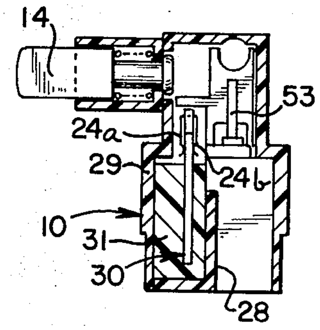
FIG. 2 is a section taken along the line 2—2 of FIG. 1.
Figure 3:
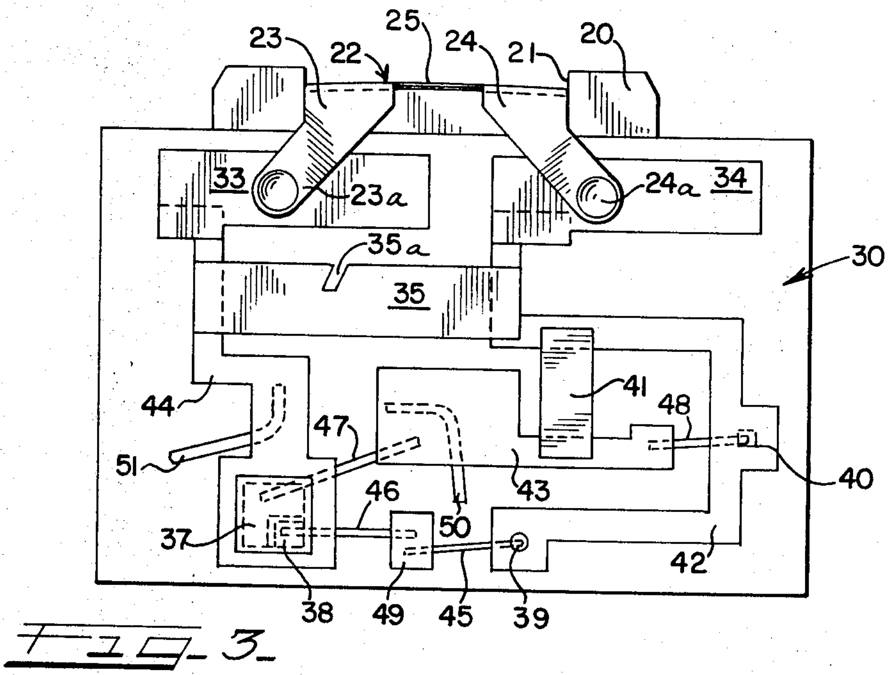
FIG. 3 is an enlarged side elevational view of the circuit board.

The trigger stem 12 includes a pocket 18 which captures or receives a bar 20 so as to impart sliding movement to the latter in response to corresponding movement of the trigger. The bar 20 has a notch or cutout 21 along the upper edge thereof for receiving the bight portion of a contact 22. The contact 22 is defined by a pair of inverted U-shaped members 23, 24 joined together by a web 25. One leg of the member 23 is defined by a contact finger **23*a*, the other leg being defined by a similar finger (not shown). In like manner, one leg of the member 24 is defined by a contact finger 24*a*, the other leg being defined by a similar finger 24*b*** (FIG. 2).

The housing 10 has an intermediate wall 28 cooperating with the casing bottom, end walls and one side wall to define a chamber 29 open at the top thereof. A ceramic circuit board 30 is disposed in the chamber 29 and mounted therein in vertical disposition by being substantially embedded in an epoxy composition 31.

The circuit board 30, which is preferably made of a suitable ceramic material, mounts a pair of colinear resistance strips 33, 34. These resistance strips are engaged by the contact fingers **23*a*, 24*a*, which fingers slide along respective strips 33, 34 during reciprocal movement of the trigger. These contact fingers are maintained in sliding engagement with the resistance strips by the action of the other fingers on the members 23, 24 slidably engaging the other side of the board 30. In other words, the inverted U-shaped members 23, 24 embrace the upper marginal portion of the board 30 mounting the contact 22 for reciprocal sliding movement therealong. The two contact strips 33, 34 and the contact fingers 23*a*, 24*a*** cooperate to define a variable resistor forming one component of a speed control circuit, such as the type disclosed and claimed in Gawron Pat. 3,209,228, for example. The present invention is not to be limited for use only with the aforementioned Gawron circuit. It will be understood the variable resistor could be defined by a single resistance strip and a single sliding contact therefor.

The circuit board 30 mounts a resistance strip 35 which defines a fixed resistor. This resistance strip, as well as the resistance strips 33, 34, are preferably "printed" on the circuit bo ard by well known processes.

The circuit board 30 may also mount the following additional circuit components of the aforesaid Gawron circuit mentioned by way of example: a chip-type or unencapsulated controllable semiconductor 37, such as a silicon controller rectifier (SCR), having a gate 38, a chip-type trigger device 39, a chip-type rectifier or diode 40, and a chip-type or unencapsulated capacitor 41. These components are connected to define the speed control circuit by means of printed conductor strips 42, 43, 44 and conductor wires 45, 46, 47 and 48. A printed contact pad 49 establishes contact between adjacent ends of the concontact wires 45, 46 thereby to reduce the amount of expansion that would be present if only a single conductor wire extended between the gate 38 and the trigger device 39.

The conductor strips 42, 43 and 44 are preferably printed on the ceramic board by a "silk screen" method with a conductor material of palladium silver or other low electrical resistance material which is used for interconnecting components and soldering of the semiconductor devices. The semiconductors and other components are soldered to the printed conductor pads or strips.

It is noted that the conductor strips 42, 43 place the fixed resistor 35 in series with the fixed resistor strips 33, 34 of the variable resistor. The fixed resistor strips may be "trimmed" to serve as a means for calibrating the circuit to compensate for variables resulting from random selection of circuit components and from differences in thicknesses, for example, of the resistance strips 33, 34. This trimming operation may be readily accomplished by abrading away a portion 35*a* of the fixed resistance strip 35. This trimming operation obviates the need for preselection and matching of the various circuit components to minimize performance variations in completed speed control units Preferably, the various components defining the speed control circuits are physically arranged or located on the circuit board 30 in the manner shown for more even distribution of heat throughout the circuit board. In a preferred embodiment, all of the circuit board, except the uppermost portion supporting the resistance strips 33, 34 and 35, is embedded within the epoxy material 31. This material acts as a heat sink to transfer heat from the circuit board components during operation of the circuit.

The speed control circuit is associated with an on-off switch and a bypass switch (not shown), the latter coming into play when the trigger is fully depressed thereby to provide full speed operation of the tool motor directly from line current bypassing the speed control circuit. This on-off and bypass switch construction may be of the type shown in the application of Carl J. Frenzel, Ser. No. 822,909, filed May 8, 1969. The rocking contact shown in the aforesaid Frenzel application is represented in FIG. 2 herein in more or less diagrammatic form and indicated as 53.

Thus it will be seen that the present invention provides a new and improved trigger operated speed control unit which includes a unique circuit board mounting all of the components of a speed control circuit. This arrangement provides for compact, inexpensive construction, greatly facilitates assembly of the speed control unit, and eliminates the need to preselect and match circuit components.

I claim:

1. In a trigger operated speed control unit for use in controlling the speed of a motor in an associated power tool or the like, wherein said unit is of the type adapted to include a speed control circuit having a variable resistor as one component thereof, the improvement comprising:

(a) a casing mounting a trigger for oscillating movement with respect thereto;
(b) a printed circuit board in said casing;
(c) a resistance strip printed on a first portion of said circuit board in direct intimate physical contact therewith;
(d) a contact carried by said trigger for movement therewith, which contact slides along said resistance strip during movement of said trigger thereby defining said variable resistor; and
(e) a plurality of circuit elements mounted on another portion of said board in direct physical contact therewith and which define substantially all of the other components of said speed control circuit, an encapsulating composition in said casing and in substantial coextensive contact with said another portion of said circuit board thereby encapsulating said circuit elements.

2. The improvement according to claim 1 wherein said resistance strip has its face parallel with one face of said board in substantial coplanar relation with the latter.

3. The improvement according to claim 2 wherein said other components are mounted on said one face of said board.

4. The improvement according to claim 3 wherein said resistance strip extends along one margin of said circuit board and wherein said contact includes fingers engaging said resistance strip and the other side of the circuit board.

5. The improvement according to claim 1 further defined by:

(a) said casing defining a chamber;
(b) said circuit board being disposed in said chamber; and
(c) said encapsulating composition being in said chamber substantially embedding said circuit board and acting as a heat sink for said other components.

6. The improvement according to claim 1 further defined by:

(a) said circuit board being defined by a ceramic member; and
(b) said other components including at least a capacitor, a controllable semiconductor and a triggering element for the latter.

7. The improvement according to claim 6 further defined by:

(a) said casing defining a chamber;
(b) said circuit board being disposed in said chamber; and
(c) said encapsulating composition being in said chamber substantially embedding said circuit board and said other components and acting as a heat sink for the latter.

8. The improvement according to claim 1 further defined by:

(a) said resistance strip having its face parallel with one face of said board in substantial coplanar relation with the latter and extending along one margin of said circuit board; and
(b) said other components being mounted on said one face of said circuit board and including at least a capacitor, a controllable semiconductor and a triggering element for the latter.

9. The improvement according to claim 8 further defined by:

(a) said casing defining a chamber;
(b) said circuit board being disposed in said chamber; and
(c) said encapsulating composition being in said chamber substantially embedding said circuit board and acting as a heat sink for the latter.

10. The improvement according to claim 1 further defined by another resistance strip formed on said circuit board and adapted to have a portion thereof removed for establishing a desired resistance value.

References Cited

UNITED STATES PATENTS

| | | |
|---|---|---|
| 3,225,232 | 12/1965 | Turley. |
| 3,327,196 | 6/1967 | Sahrbacker. |
| 3,439,248 | 4/1969 | Winchester. |
| 3,447,057 | 5/1969 | Brown. |
| 3,456,230 | 7/1969 | Matthews. |
| 3,458,793 | 7/1969 | Tsergas. |

ORIS L. RADER, Primary Examiner

T. LANGER, Assistant Examiner

U.S. Cl. X.R.

310—50, 68